(12) United States Patent
Randjelovic

(10) Patent No.: US 9,809,982 B2
(45) Date of Patent: Nov. 7, 2017

(54) SUSPENDED MODULAR FLOORING PANEL

(71) Applicant: Connor Sport Court International, LLC, Salt Lake City, UT (US)

(72) Inventor: Erlin Randjelovic, Crystal Falls, MI (US)

(73) Assignee: Connor Sport Court International, LLC, Salt Lake City, UT (US)

( * ) Notice: Subject to any disclaimer, the term of this patent is extended or adjusted under 35 U.S.C. 154(b) by 0 days.

(21) Appl. No.: 14/993,942

(22) Filed: Jan. 12, 2016

(65) Prior Publication Data

US 2016/0237694 A1    Aug. 18, 2016

Related U.S. Application Data

(63) Continuation-in-part of application No. 14/486,784, filed on Sep. 15, 2014, now Pat. No. 9,382,717.

(60) Provisional application No. 62/107,951, filed on Jan. 26, 2015.

(51) Int. Cl.

| | |
|---|---|
| *E04F 15/10* | (2006.01) |
| *E04F 15/02* | (2006.01) |
| *B32B 37/12* | (2006.01) |
| *B32B 37/14* | (2006.01) |
| *E04F 15/04* | (2006.01) |

(52) U.S. Cl.
CPC ........ *E04F 15/02038* (2013.01); *B32B 37/12* (2013.01); *B32B 37/14* (2013.01); *E04F 15/043* (2013.01); *E04F 15/105* (2013.01); *E04F 15/107* (2013.01); *B32B 2419/04* (2013.01); *E04F 2201/0107* (2013.01); *E04F 2201/021* (2013.01)

(58) Field of Classification Search
CPC ....... E04F 13/0866; E04F 15/04; E04F 15/02; E04F 15/024; E04F 2201/0115
USPC ................ 52/177, 403.1, 390, 591.1; 156/39
See application file for complete search history.

(56) References Cited

U.S. PATENT DOCUMENTS

| | | | |
|---|---|---|---|
| 4,057,948 A | 11/1977 | Wise | |
| 5,365,710 A | 11/1994 | Randjelovic | |
| 5,787,654 A * | 8/1998 | Drost ........................ | E01C 5/20 |
| | | | 52/177 |
| 6,122,873 A * | 9/2000 | Randjelovic ............ | E04F 15/22 |
| | | | 52/391 |
| 6,189,283 B1 | 2/2001 | Bentley et al. | |
| 8,225,566 B2 * | 7/2012 | Prevost ................... | E01C 13/08 |
| | | | 52/177 |

(Continued)

FOREIGN PATENT DOCUMENTS

| | | |
|---|---|---|
| WO | WO 03/040491 A1 | 5/2003 |
| WO | WO 2015/039033 A1 | 3/2015 |

*Primary Examiner* — Paola Agudelo
(74) *Attorney, Agent, or Firm* — Thorpe North & Western, LLP

(57) ABSTRACT

A plurality of at least two modular flooring tiles coupled together to form an upper surface defined by an outer perimeter is disclosed. A plurality of side walls extends downward from the outer perimeter and a plurality of coupling members are disposed about the side walls adapted to mate with coupling members of an adjacent flooring panel. A flexible continuous synthetic overlay is disposed about and secured to the upper surface of the at least two modular flooring tiles, wherein the synthetic overlay comprises an outer perimeter substantially similar to the outer perimeter of the at least two modular flooring tiles.

10 Claims, 10 Drawing Sheets

(56) References Cited

U.S. PATENT DOCUMENTS

| | | |
|---|---|---|
| 8,397,466 B2 | 3/2013 | Jenkins et al. |
| 8,875,464 B2 * | 11/2014 | Pervan ................ E04F 13/0894 52/578 |
| 8,925,275 B2 * | 1/2015 | Meersseman ............ B27N 7/00 52/313 |
| 9,340,984 B2 * | 5/2016 | Chou .................... E04F 15/045 |
| 9,382,717 B2 | 7/2016 | Randjelovic |
| 2003/0089051 A1 | 5/2003 | Bertolini |
| 2003/0136070 A1 * | 7/2003 | Ku .......................... E01C 5/223 52/403.1 |
| 2005/0284067 A1 | 12/2005 | Mei |
| 2007/0044412 A1 * | 3/2007 | Forster ............... B29D 99/0057 52/592.1 |
| 2007/0292656 A1 * | 12/2007 | Handojo ................. B27D 1/06 428/106 |
| 2008/0034701 A1 | 2/2008 | Pervan |
| 2008/0134593 A1 * | 6/2008 | Moller .................... E04F 15/02 52/177 |
| 2008/0184647 A1 * | 8/2008 | Yau .................. E04F 15/02033 52/589.1 |
| 2010/0205885 A1 * | 8/2010 | Randjelovic ............ E04F 15/02 52/403.1 |
| 2012/0196073 A1 * | 8/2012 | Vermeulen ............. E04F 15/10 428/60 |

\* cited by examiner

SUSPENDED MODULAR FLOORING PANEL

PRIORITY CLAIM

The present application claims priority to U.S. Ser. No. 62/107,951 filed on Jan. 26, 2015 and entitled, "Suspended Modular Flooring Panel" which is incorporated herein by reference in its entirety. The present application is also a continuation-in-part of U.S. Ser. No. 14/486,784 entitled "Flooring Surface Integrated With Interlocking Plastic Base" filed on Sep. 15, 2014 which is also incorporated herein by reference in its entirety.

FIELD OF THE INVENTION

The present invention relates to flooring tiles and more particularly to improved suspended synthetic flooring tiles and methods of manufacturing the same.

BACKGROUND

Many designs of sports floors have been produced to satisfy the needs of sports competition as well as recreational physical and sporting activities. The technical criteria of sports floors therefore vary depending on the required use tempered by financial and economic constraints because the investments are costly and must be able to be rapidly amortized. Different types of sports floors have been used, such as point elastic floors, area elastic floors and combined elastic floors. Point elastic floors are made of synthetic materials produced in one or more layers provided in strips rolled out to a desired length and placed directly onto a receiving base (i.e., concrete). In this implementation, the weight of the athlete is spread over an area only slightly greater than the surface area of the athlete's foot with an impact zone of tenths of inches around the foot. This type of covering is satisfactory in relation to its low cost and its properties of durability (wear, maintenance, resistance to impacts). However, the sporting properties are limited due to the thickness-flexibility compromise of the floor which prevents the cushioning layer from being increased without experiencing problems of stability or support.

Area elastic floors can be made of synthetic or wood-based materials, the load of the athlete being spread over an area much greater than the area of the foot (several inches around the foot). In the past, certain area elastic floors comprise a first covering made of polyurethane foam of a certain thickness onto which are placed two superposed tiers of wood panels arranged in staggered pattern, with a finish covering. However, the investment in an area elastic sports floor of this type is high. The installation time can be long due to the disposition of the two tiers of wood panels and the difficulties of correctly filling the entire playing surface. In addition, certain disadvantages have been observed. The wood panels are sensitive to humidity which tends to rise from the concrete base. This may alter the characteristics of the floor with inappropriate effects. Furthermore, the cost of maintenance is high. Wood panels may also expand and deform due to the ambient environment and temperature, and thus modify the conditions of sealing between panels. Certain suspended synthetic flooring with area elastic properties offers significant advantages over wood-based area elastic flooring surfaces including resilience, durability, ease of installation, and transportation. Creating molds for numerous shapes and sizes of synthetic flooring products, however, is expensive. Moreover, changing molds during the manufacturing process is a time-consuming effort.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

Figure 1:
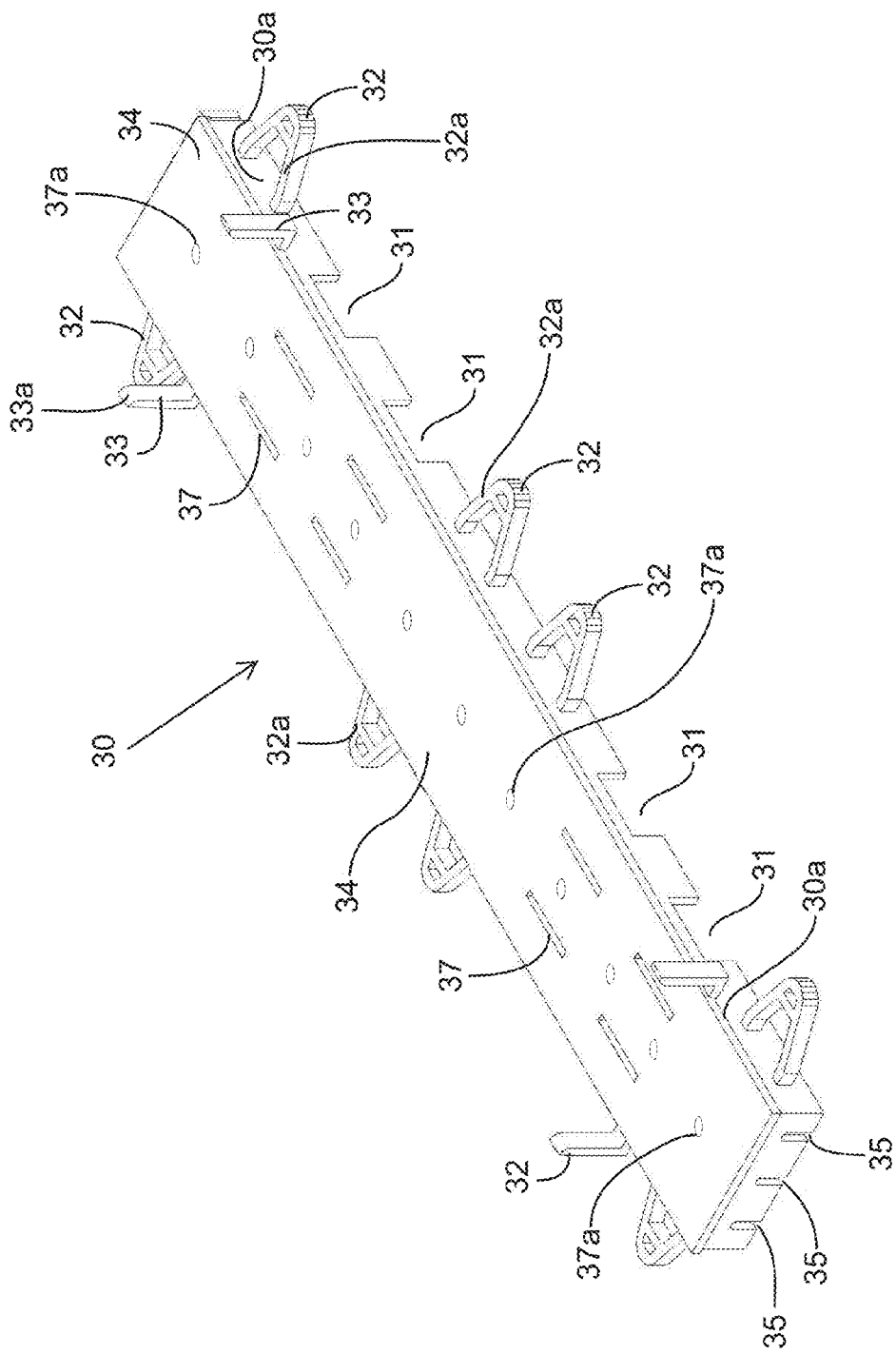
FIG. 1 is a perspective view of an elongate base panel in accordance with one aspect of the technology.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the technology will be best understood by reference to the accompanying drawings, wherein the elements and features of the invention are designated by numerals throughout. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The present technology can be generally described as an improved synthetic flooring system comprising a continuous vinyl sheet secured to at least one or a plurality of modular flooring tiles. In one aspect, the synthetic flooring system is placed over an underlayment and a hard surface (i.e., concrete), though the use of the underlayment is not always necessary.

In accordance with one aspect of the technology, the present technology resides in a plurality of interconnecting elongate molded plastic base components disposed on a ground surface. The plastic components comprise a plurality of mating locking hooks and slots for receiving said hooks. Prior to disposing the base components onto the ground surface in an assembly, an elongate contact surface material, such as hard wood, is secured on top of the base component. The end result is an improved composite flooring section that may be interlocked with an adjacent flooring section. As will be appreciated, since the subject base component incorporates the use of synthetic materials, which may include recycled plastic materials, it has, among others, the advantage of being environmentally friendly, e.g., it reduces the use of forestry materials. The decrease in use of forestry materials also results in decreased weight of the end product which reduces shipping costs and increases the ease of installation. In addition, it will be understood that the base component has the advantage of providing design flexibility, e.g., the formed base components can be provided with a wide range of cavity designs that, in turn, allow for strategic placement of contact flooring components.

While specific reference is made herein with respect to flooring products, it is understood that the processes and technology described herein could be implemented in other technology fields such as wall or ceiling paneling and any claims directed towards such a use are contemplated herein.

The process for manufacturing solid wood flooring requires precision cutting as the dimensioning and tolerances for abutting wood slats on an athletic flooring surface are very rigid. For example, the National Wood Flooring Association recommends machining tolerances for conventional wood floors in the thousandths of inches. Aspects of the present technology provide systems and methods for preparing a composite wood/plastic flooring component that can include a rough-cut wood plank that is later cut to a precise length and width matching precisely the underlying plastic base component. Generally speaking, a rough-cut wood plank is placed face down on a work surface. An industrial adhesive is placed on the back side of the wood plank and the plastic base component is pressed face down on the back side of the wood plank. The rough-cut wood plank is sized larger than the outer dimensions of the plastic base component to accommodate precision cutting at a later time. Once the assembly is complete and the assembly is cut, the composite flooring component is capable of mating with other composite flooring components to form a flooring surface that mimics a conventional wood flooring assembly without the attendant drawbacks of such an assembly. Specifically, the hardwood sections will abut closely with one another side-to-side and end-to-end in a manner similar to a conventional tongue and groove assembly.

Turning now to the figures, FIG. 1, is a perspective detail showing one aspect of the technology, disclosing an elongate synthetic base panel section 30 having side wall slots 31 and locking hooks 32. Side wall slots 31 in a first base panel section will mate with locking hooks 32 in a second adjacent base panel section. The base panel section 30 is made of any suitable synthetic material, including, but without limitation, thermoplastics and thermosetting polymers. For example, in accordance with one aspect of the technology, base panels 30 are preferably manufactured in typical plastic molding operations, with the most preferred material being a type of commonly molded plastic. Polypropylene, polyethylene, and PVC represent a few examples of numerous types of plastics that can be used. The base panel 30 may be formed using conventional molding techniques, such as injection molding, or other molding processes known to one of ordinary skill in the art. In one aspect of the technology, the base panel section 30 will have a height ranging between 0.5 and 1.0 inches with a preferred height of 0.75 inches; a width ranging between 1.75 and 3.0 inches with a preferred width of 2.25 inches; and a length of 12.0 to 18.0 inches with a preferred length of 16.0 inches. In one aspect of the technology, the contact surface material 42 will have a thickness ranging from between 0.10 to 0.50 inches with a preferred thickness of 0.25 inches. Of course, other dimensions may be used as suits a particular application without departing from the spirit of the technology described herein.

The term "contact surface material" as used herein refers generally to any material disposed on the base panel section 30 and is used as the final contact or playing surface for the finished floor. In one aspect of the technology, the contact surface material 42 comprises a solid hard wood material such as maple or beech wood. However, other contact surface materials are contemplated for use herein including synthetic materials such as a laminate or other polymer materials or wood-based materials. Use of the term "natural wood material" or "wood-based material" within this document includes wood products such as solid hard wood referenced above, plywood, HDF, MDF, LDF, and other wood products known to one of ordinary skill in the art. Material such as rubber, cork, vinyl and other materials suitable for floor applications can also be secured to plastic base panels 30 as the contact surface material 42. Moreover, while specific reference is made herein to a single surface contact material 42 being secured to a plastic base panel 30 forming a two-layer composite material, more than one layer of material may be secured to the plastic base panel 30 as suits a particular application. For example, a resilient layer may be disposed between the surface contact material 42 and the plastic base panel 30 forming a three-layer composite structure.

Removable alignment wings 33 protrude upward in strategic locations at a designated height above the base plate top surface 34. In one aspect of the technology, the alignment wings 33 are molded into the base plate section 30 and have a general L-shaped geometry with a tapered top section 33a. The alignment wings 33 are located about the side 30a of plate section 30 and extend outward from the sides 30a approximately 0.25 inches and upward approximately 0.5 inches. A bottom 33b of alignment wings 33 is disposed at an elevation above the top 32a of locking hook 32. The alignment wings 33 serve numerous purposes. First, the alignment wings 33 serve as an alignment guide when placing a flooring material 42 (e.g., a rough-cut wood plank) atop the base plate top surface 34. In this manner, the rough-cut wood plank may be placed on the top 34 of the base plate 30 in such a way as to optimize its placement for proper securement and later cutting. In one aspect, the rough-cut plank exceeds the lateral and longitudinal dimensions of the base plate 30 slightly (e.g., 0.1 inches) so that the entire assembly may be precision cut at a later time. Second, the alignment wings 33 also serve as trimming guides. That is, after a contact surface material 42 is secured to the top surface 34 of the base plate 30, the entire assembly is turned upside down and placed face-down on an assembly line for trimming the sides of the flooring material to match the width of the base panel 30. The alignment wings 33 are disposed within a journaled track that is oriented parallel with the assembly line. As such, the alignment wings 33 maintain the alignment of the composite flooring member with respect to the trimming tool (e.g., a saw) as it travels down the assembly line. In one aspect of the technology, the alignment wings 33 are cut from the base panel 30 as it travels down the assembly line to produce a final product with precision cut edges.

While specific reference is made herein to an L-shaped alignment wing, other shapes are contemplated for use herein. For example, an arcuate arrangement may be used to accommodate different types of flooring materials or different rough cuts. Moreover, other means for providing a trimming guide are contemplated herein. For example, in one aspect of the technology, the trimming guide may be a clip or other device affixed to the contact surface material itself which is also removed from the flooring material as it travels down the assembly line. Other arrangements for precision cutting of the composite base plate 30/contact surface material 42 are contemplated herein. For example, a rough-cut contact surface material 42 may be secured to a top surface 34 of the base plate 30 and placed on a track with appropriate guide rails built into the track that provide appropriate dimensioning based on the width of the base plate 30 without use of any trimming guides associated with the composite product itself.

Surface slots 37 are disposed in the top plate surface 34 and, in some aspects, are present as a result of the molding process. In another aspect of the technology, weep holes 37a are disposed about the top surface 34. The weep holes 37a provide a means for flowable adhesive placed on a back side of a contact surface material 42 to pass through the top surface 34 of the base panel 30 and pool on the bottom side of the base panel 30. In one aspect of the technology, the weep holes 37a are placed longitudinally down the center of the base plate 30. In other aspects, however, the weep holes 37a are placed in a grid about the entire top surface 34 of base plate 30. In one aspect, the weep holes 37a are beveled or tapered on the top surface 34 of the base panel 30 or on the back surface as suits a particular application to increase the total surface area in contact with the adhesive. The weep holes 37a may be circular, rectangular, or any other shape as suits a particular application and has an opening area ranging from 0.05 to 1.0 inches. In a preferred aspect, the area of the opening of any individual weep hole 37a will not exceed 0.25 inches.

In one aspect of the technology, the adhesive is a commercial grade pressure sensitive adhesive or contact adhesive including, but without limitation, urethanes, polymer-based adhesives, and the like. While reference is made herein to a process whereby the contact surface material 42 is secured to the base panel 30 by way of an adhesive, it is understood that other means of securing the contact surface material 42 to the base plate 30 are contemplated herein. By way of example only, the contact surface material 42 may also be secured by using a bolt and nut assembly, threaded screws, rivets, or other securing means.

Figure 2:
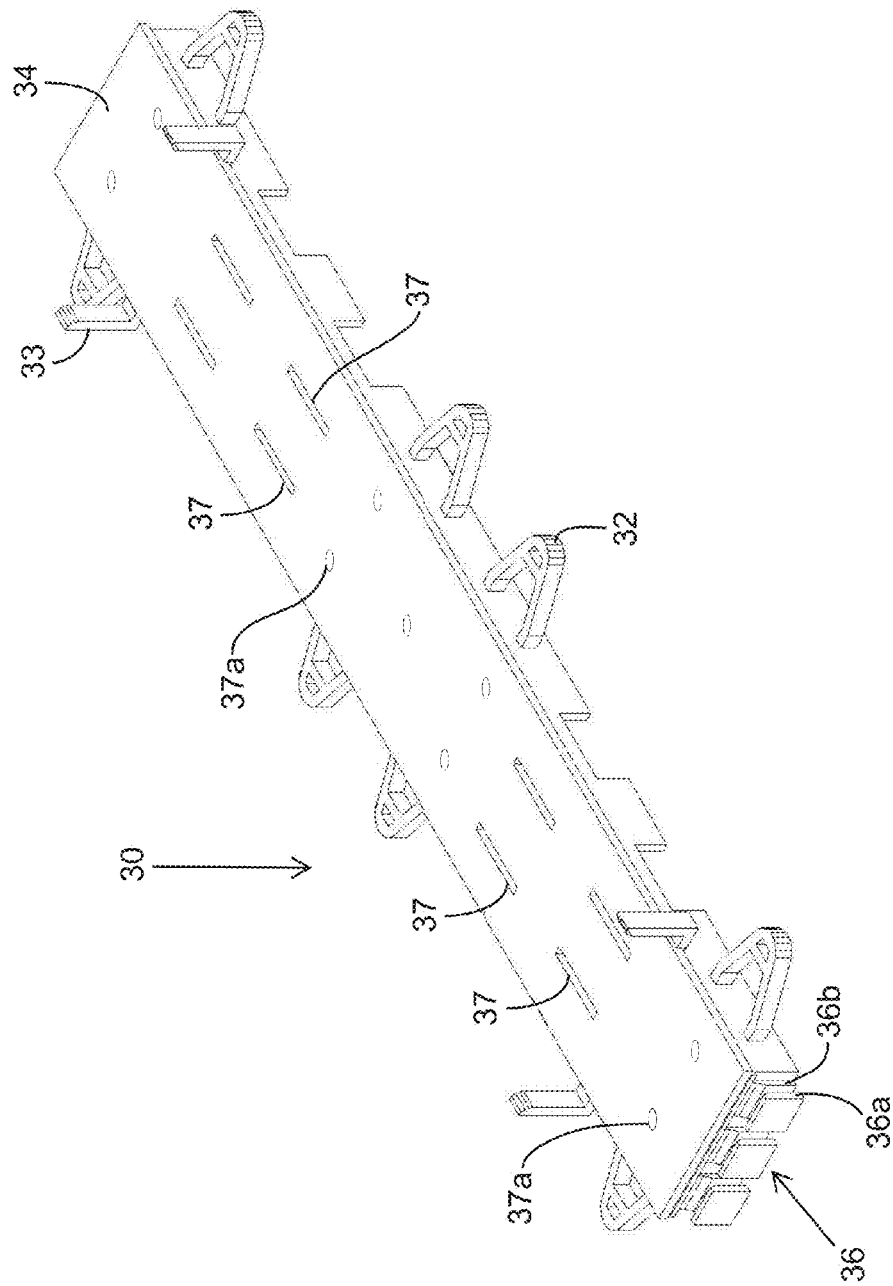
FIG. 2 is a perspective view of an elongate base panel in accordance with one aspect of the technology.

With additional reference to FIG. 2, which is a perspective detail showing a base panel section 30 in an opposing direction to the detail as shown in FIG. 1 showing a different arrangement of weep holes 37a. End locking slots 35 are included at one end of each base panel section 30 as shown in FIG. 1 and are intended to mate with end locking tabs 36 that are disposed at an opposite end of each base panel section 30. The end locking tabs 36 comprise three rectangular-shaped protrusions 36a separated from three adjacent rectangular-shaped protrusions 36b by a narrow member 52. The protrusions 36a, 36b are disposed substantially parallel with the end of the base panel 30. The narrow member 52 is disposed substantially perpendicular to the end of the base panel 30 and the rectangular-shaped protrusions 36a, 36b. When mating two adjacent ends of base panels 30 together, an end 50 of the first base panel 30 is disposed between the end locking tabs 36 and the end 51 of the second base panel 30. The end locking tabs 36 are disposed behind the end 50 of the first base panel 30. The narrow member 52 connecting the end locking tabs 36 with end 51 of the second base panel 30 is disposed within the end locking slots 35. The rectangular-shaped protrusions 36a, 36b are beveled near a top of the protrusion to enable placement of the end 50 of the first base panel 30 between opposing rectangular-shaped protrusions 36a, 36b. While the protrusions herein are shown as having a generally rectangular shape, it is understood that any desirable shape could be used in connection herewith.

Figure 3:
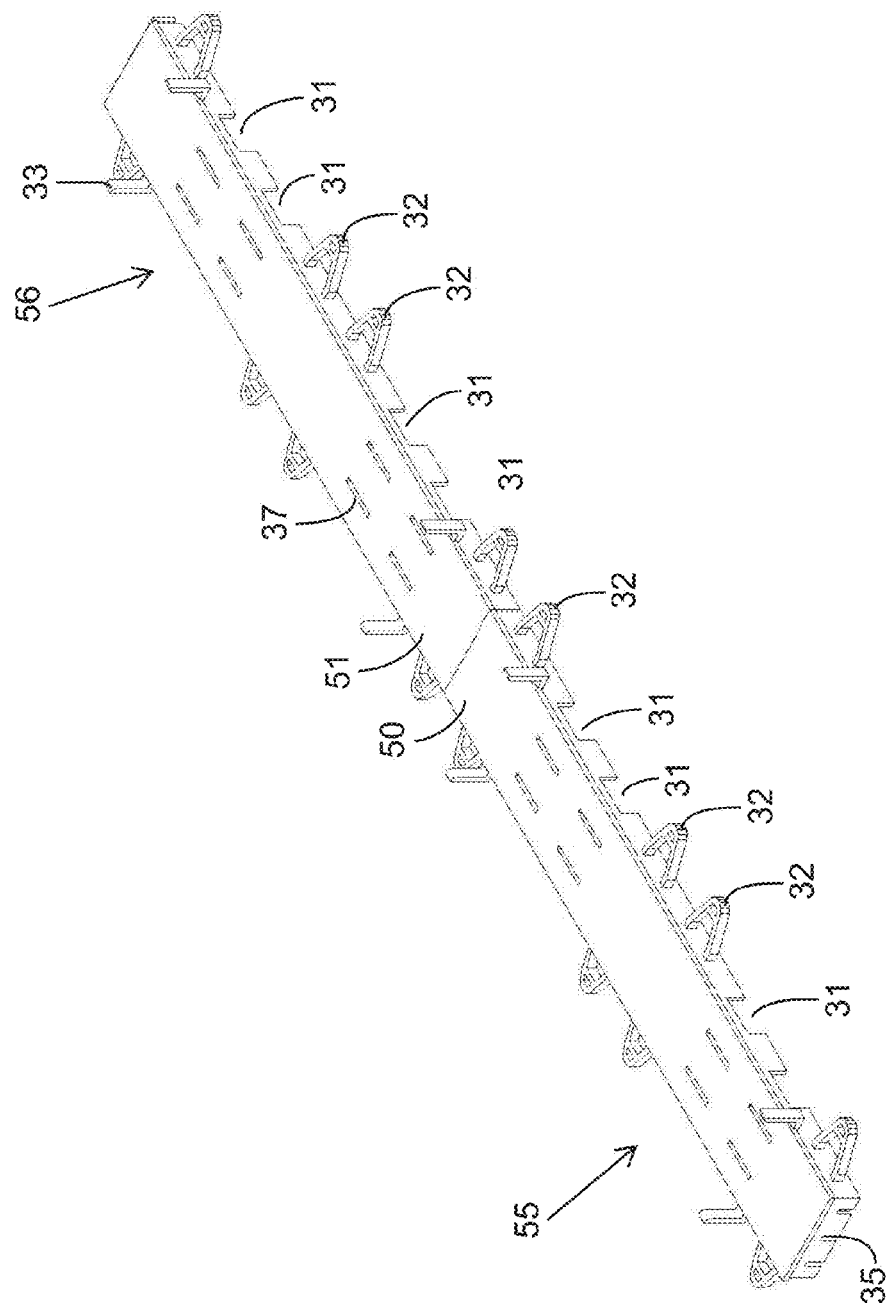
FIG. 3 is a perspective view of two elongate base panels mated together in accordance with one aspect of the technology.
Figure 4:
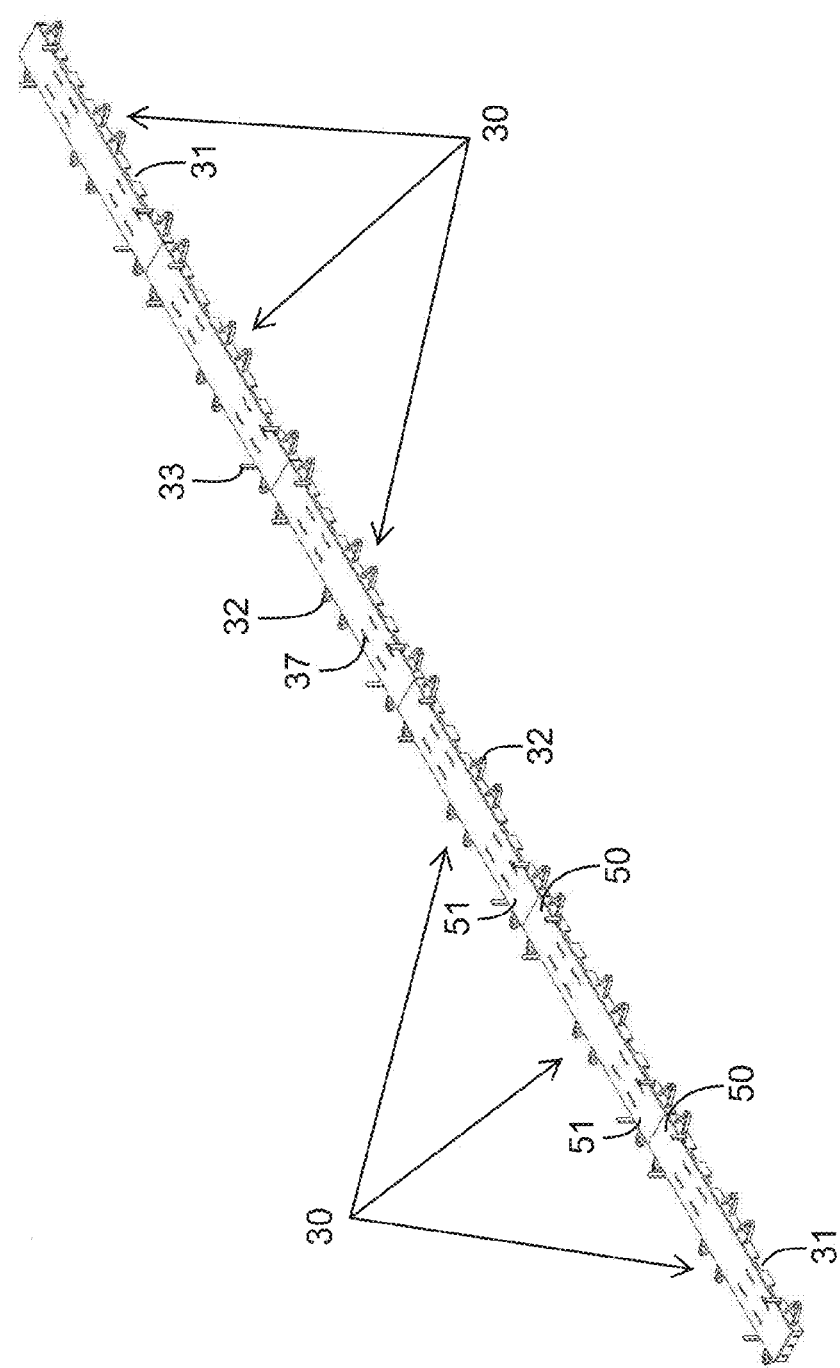
FIG. 4 is a perspective view of six elongate base panels mated together in accordance with one aspect of the technology.

FIG. 3 is a perspective detail showing connection of two base panel sections 30 attached end-to-end to create a continuous pattern of two wall slots 31 adjacent to two locking hooks 32. FIG. 4 is a perspective detail showing connection of numerous base panel sections 30 to form a desired length for attachment to a preferred surface material length. For example, if it were desirable to have a flooring configuration with wood flooring panels that were six inches in width and eight feet in length, a plurality of six-inch wide base panels are placed end to end until the eight-foot length is reached. Once the panels are secured end-to-end, a wood-flooring material that is at least eight feet in length and at least six inches wide is secured to the connected base-panel section. In a preferred aspect, the wood-flooring material is slightly longer than eight feet and slightly wider than six inches so that it may be trimmed to precisely match the length and width of the connected base-panel section.

Figure 5:
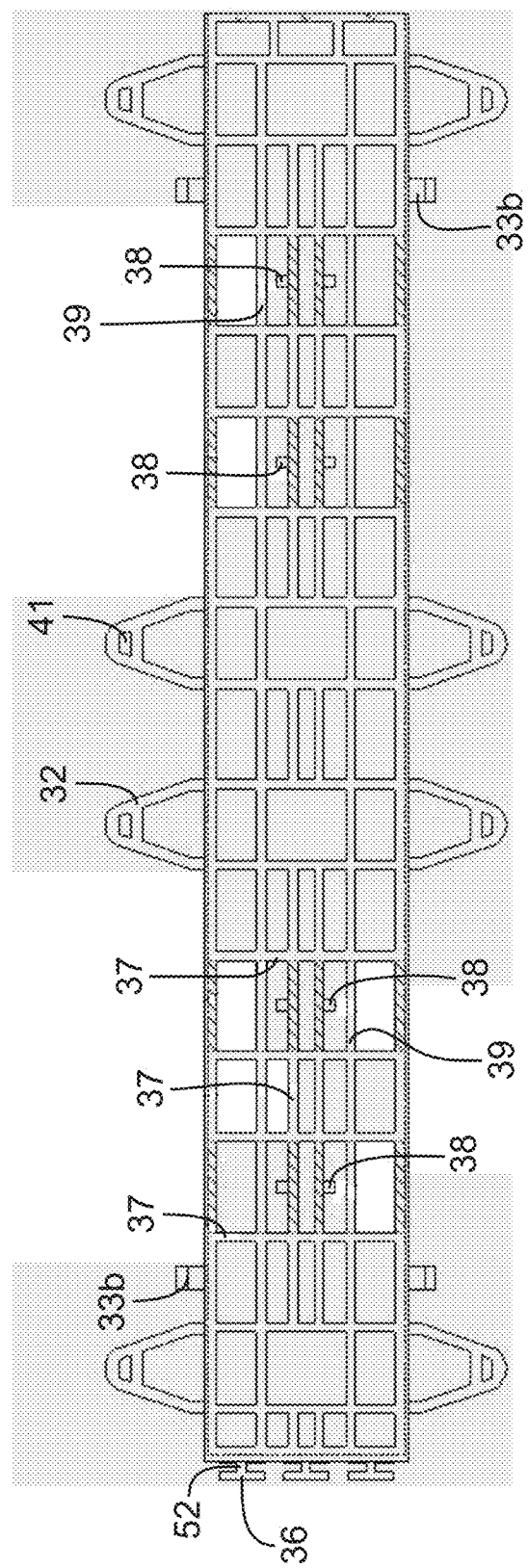
FIG. 5 is a top skeletal view of a base panel section without an upper plate surface in accordance with one aspect of the technology.
Figure 6:
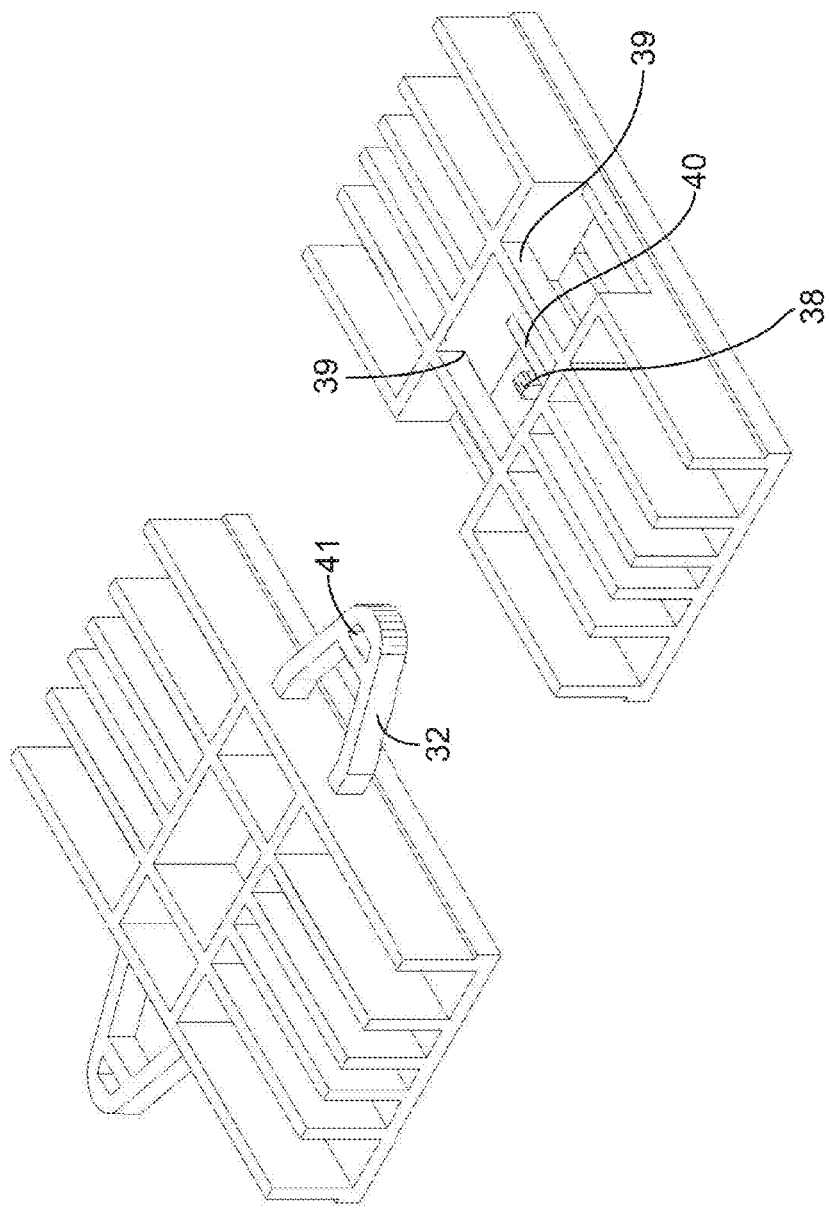
FIG. 6 is a perspective cut away view showing a locking mechanism in accordance with one aspect of the technology.
Figure 7:
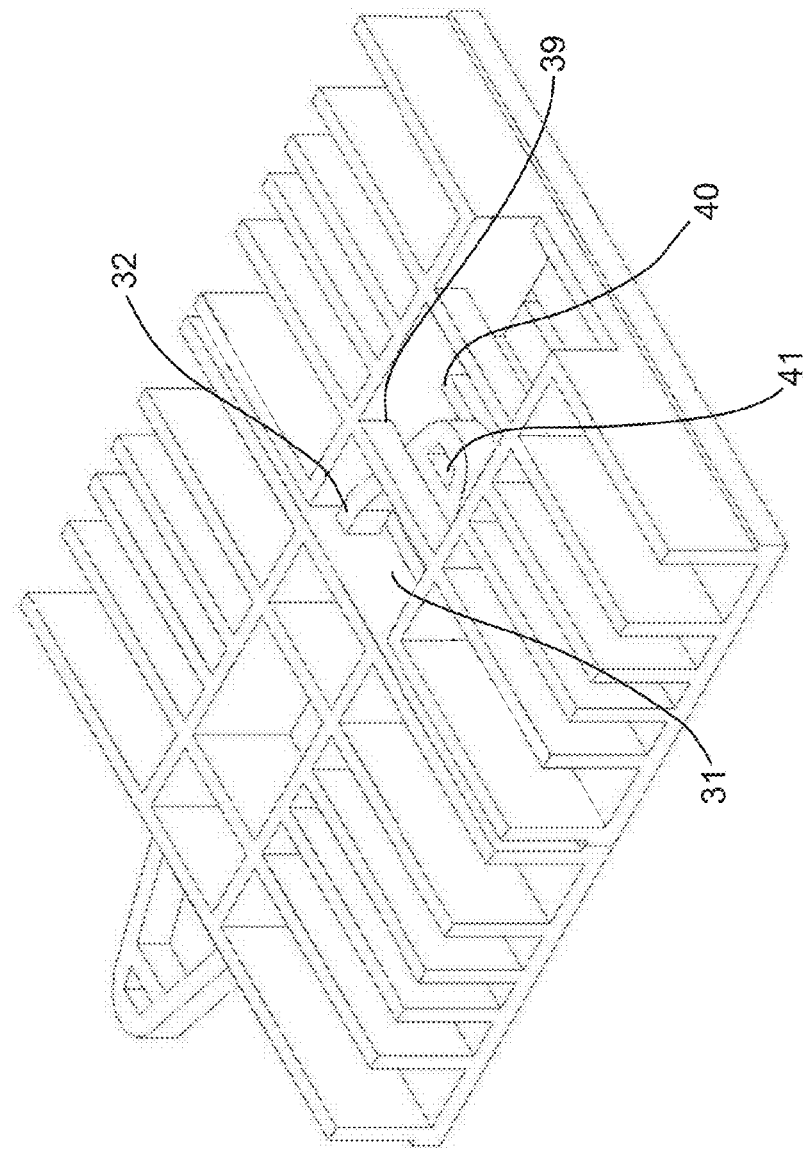
FIG. 7 is a perspective cut away view showing a locking mechanism in accordance with one aspect of the technology.

FIG. 5 is a top skeletal view of a base panel section 30 without the upper plate surface 34. Wall slots 31 and locking pins 38 are disclosed. Locking pins 38 engage with locking hooks 32 as described further below. With reference now to FIGS. 6 and 7, an underside perspective view of adjacent portions of base panel sections 30 is disclosed. FIG. 6 shows the adjacent sections in an unconnected state while FIG. 7 shows the adjacent sections connected. Specifically, a first base panel section 55 having two locking hooks 32 on opposite sides prior to penetration through a side wall slot 31 in a second base panel section 56 is shown. The second base panel 56 has a side wall slot 31 that passes from one side of the second base panel 56 to the adjacent side. The slot 31 comprises an upper wall 39 and a lower wall 40. Locking hook 32 is generally A-shaped extending outward from a side of the first base panel 55. The distal end of the locking hook 32 has an end pocket 41 for attachment to locking pin 38 once the hook 32 is inserted into slot 31. As the locking hook 32 is inserted into slot 31 it is inserted below the upper wall 39 and above the lower wall 40 until locking pin 38 engages with end pocket 41. In this manner, locking pin 38 engagement with the locking hook 32 minimizes lateral movement in and out of the slot 31, while the upper wall 39 and lower wall 40 engagement with the locking hook 32 minimizes any tendency of the first base panel 55 to pitch or roll with respect to the second base panel 56.

Figure 9:
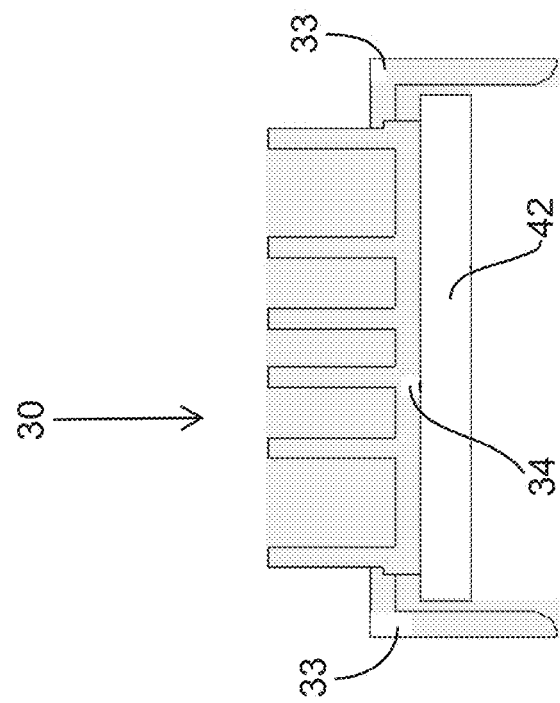
FIG. 9 is a side cut away view of a base panel and contact surface material in accordance with one aspect of the technology.
Figure 8:
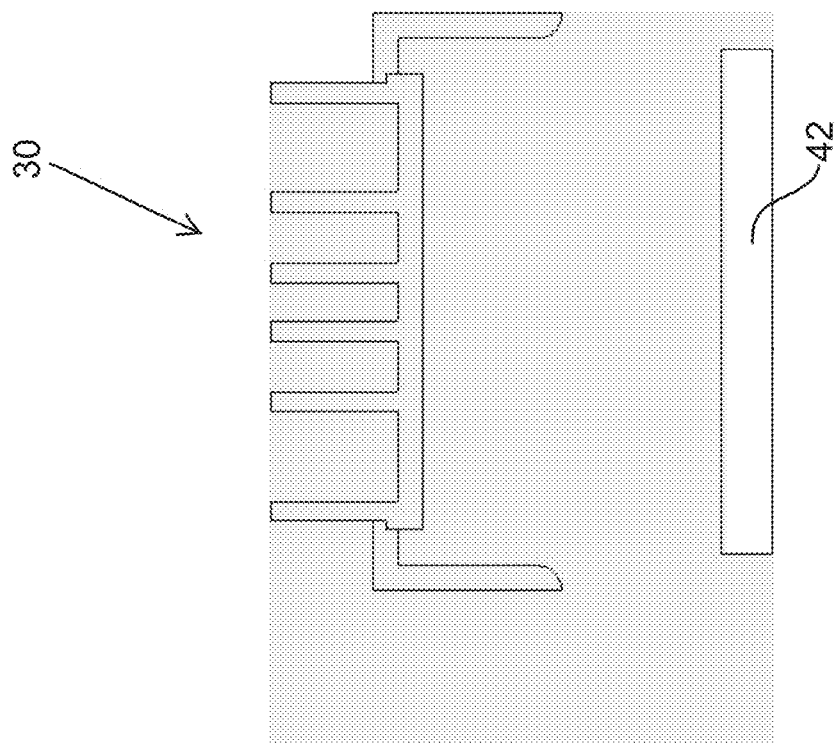
FIG. 8 is a side cut away view of a base panel and contact surface material in accordance with one aspect of the technology.

FIG. 8 is an end view of a base panel 30 in an upside down position showing positioning of contact surface section 42 which, in accordance with one aspect of the technology, is dimension wood material. FIG. 9 is an end view showing placement of base panel 30 onto surface section 42 after securing the contact surface section 42 to the base plate top surface 34. Following securement, alignment wings 33 are removed and contact surface section 42 is trimmed accordingly to match the width and length of base panel section 30. In accordance with one aspect, the surface section 42 has a finished upper surface prior to being secured to the base panel 30. In this manner, once the contact surface section 42 component of the composite contact surface section 42/base panel 30 is trimmed to the desired length and width, it is substantially ready to be packaged and shipped. In another aspect, however, the contact surface section 42 is substantially unfinished. That is, in the case of wood material, it has no sanding, painting, or finish coating prior to be secured to the base panel 30. Once secured, the contact surface section 42 is trimmed to an appropriate width and length and then finished and treated according to a desired specification.

Figure 10:
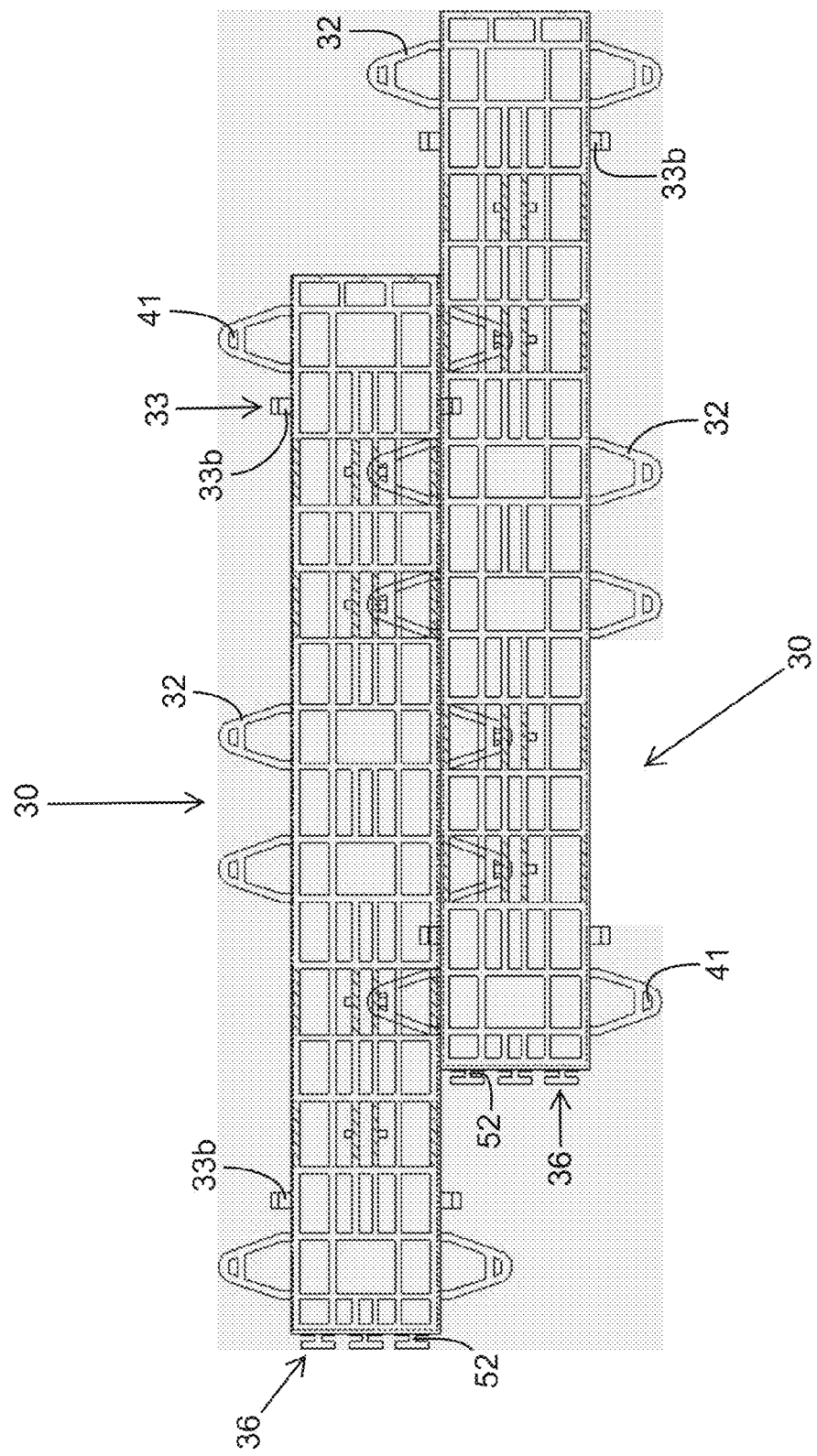
FIG. 10 is a skeletal top view of adjacent base panel sections without a base plate surface.

Referring now to FIG. 10, a skeletal top view (i.e., with no base plate surface) showing attachment of adjacent base panel sections 30 as described above is provided. Locking hooks 32 are disposed within slots 31 and between upper wall 39 and lower wall 40 with the end pocket 41 of the locking hooks 32 engaged with the locking pin 38. While specific reference is made to locking hooks and pins, it is understood that other connection arrangements may be used in connection herewith.

In accordance with one aspect of the technology, before the base panel sections 30 are connected together, the surface section 42 is secured to the base panel 30 and trimmed accordingly. As such, alignment wings 33 will not be present in an assembly where base panels 30 are connected side-to-side as alignment wings 33 are removed during the trimming process.

Figure 11:
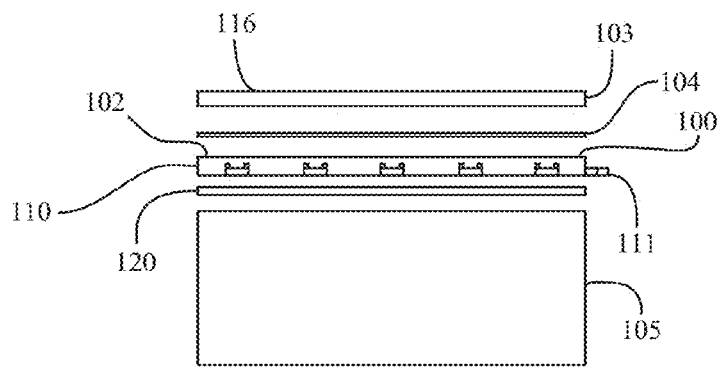
FIG. 11 is a side view of a product configuration of a base panel and contact surface material in accordance with one aspect of the technology.
Figure 12:
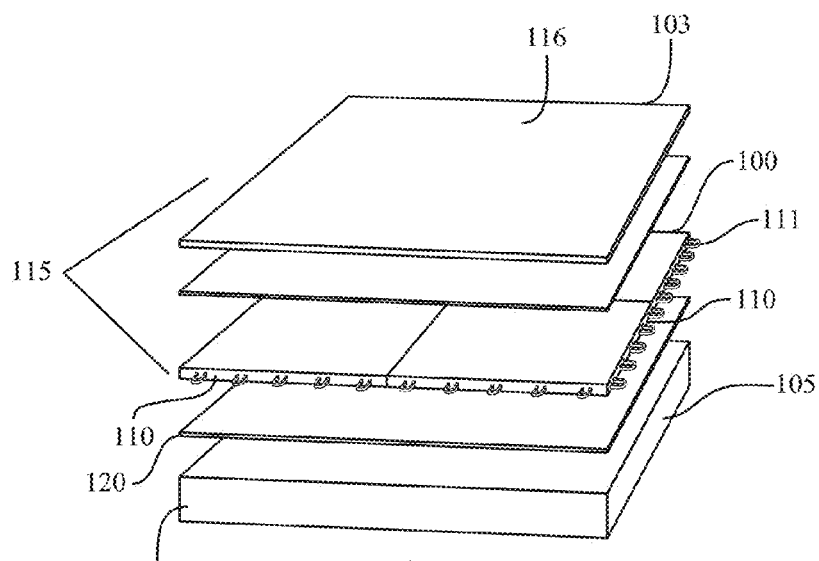
FIG. 12 is a perspective view of a production configuration of a plurality of base panels and a single contact surface material in accordance with one aspect of the technology.
Figure 13:
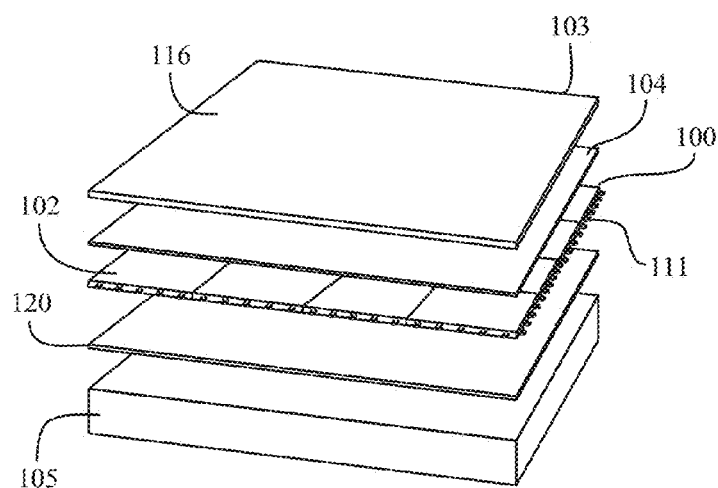
FIG. 13 is a perspective view of a product configuration of a plurality of base panels and a single contact surface material in accordance with one aspect of the technology.

With reference generally to FIGS. 11-13, vinyl flooring has been a popular floor covering material for many years and is available in either tile or sheet form for both commercial and residential use. As finished flooring material, vinyl tile has been used in commercial, institutional and public building applications, such as, for example, malls, schools, healthcare facilities, convention and exposition centers, civic buildings, private office buildings and so forth. Vinyl flooring can also have acoustical properties such that the material offers some rebound or resilience upon compression (i.e., when walked on). Vinyl sheets can be composed of colored vinyl formed into generally planar solid sheets by heat and pressure, and cut into squares or other shapes as suits a particular purpose. Vinyl sheets can be manufactured to resemble wood, stone, terrazo, and concrete. In certain aspects of the technology, the vinyl sheet is coupled to a foam backing (made of polyurethane, for example) to form a vinyl composite having certain area elastic properties.

In one aspect of the technology, flexible vinyl sheets 103 range from 0.25 to 2.0 inches in thickness and have a continuous upper surface. In one aspect of the technology, the vinyl sheet 103 has a ball rebound ranging greater than 90%, a sliding effect ranging from between 70 and 120, and a vertical deformation greater than 0.10 inches all as measured pursuant to ASTM 2772. In one aspect of the technology, the vinyl sheet 103 comprises four components assembled together in four layers. Generally speaking, a base component, two intermediate components (in a particular structure other than wood panels), and a top component constitute a point elastic floor. In accordance with one aspect, the base component comprises a layer of polyurethane foam obtained, for example, with recycled material. The two intermediate components constitute modules in the form of plates. Each module is made according to a particular design, in a material other than wood and more specifically in a specific synthetic or composite plastic material providing a lightness loading. Each module has a median honeycomb structure based on plastic material, and preferably, on polypropylene or similar material receiving on its outer and lower face two identical rigid or semi-rigid plates made of a nonwoven material, each plate being secured to the honeycomb structure by any appropriate means, bonding or other. Each plate is thin and covers the whole honeycomb structure to configure a module. Specifically, each plate incorporates means of reinforcement disposed in a configuration of weft threads and warp threads. These means of reinforcement are, for example, made from glass fibers. The module thus produced, with its honeycomb structure allows air circulation and therefore provides aeration of the combined elastic floor and so effectively combats the effects of the rise of humidity. Furthermore, the disposition and orientation of the means of reinforcement confer rigidity on the plate and therefore on the subassembly defined by the two loads and the honeycomb structure. This also provides dimensional stability. The top component constitutes the point elastic floor portion receiving contact from users (e.g., basketball players) and is made of polyvinyl chloride (PVC) and polyurethane foam. In one aspect, a liquid adhesive is disposed on the bottom of the composite vinyl sheet 103, for example, a conventional foam roller. The adhesive is absorbed and/or adheres to the bottom surface of the vinyl sheet 103 and is air dried for about 5-20 minutes to evaporate moisture and create a permanent tacking condition. The resulting "dry" adhesive is pressure sensitive and has sufficient tack to hold the vinyl sheet 103 to a base panel. Moreover, the properties of the adhesive allow the vinyl sheet 103 to be rolled or folded for storage and transport, and later unrolled or unfolded during installation without impairing the bond between the different layers of the vinyl sheet 103.

In accordance with one aspect of the technology, the vinyl sheets 103 are disposed atop a synthetic modular tile (i.e., a base panel) 100. According to one method, the vinyl sheet 103 is installed by unrolling a length of the product directly over one or more modular tiles 100, and then cutting this length from the roll and to the dimensions required to fit the modular tiles 100. Light pressure is then applied uniformly over the top surface of the vinyl sheet 103 to adhere the product to the modular tiles 100. In one aspect, the adhesive is formulated as a water dispersion of polymeric material. In one example, the adhesive includes the following ingredients with percentages generally given by weight of the overall composition:

96% to 98% of an aqueous dispersion of acrylic copolymer containing carboxyl groups;
   1.50% to 2% polyacrylate solution;
   0.5% to 1% neutralizing agents;
   0.1% to 0.2% biocide;
   0.1% to 0.2 green pigment dispersion; and
   0.025% to 0.075% silica organic defoamer.

In one aspect, the liquid adhesive is applied to the vinyl sheet 103 during manufacture at a rate of about 12-28 square yards per wet quart. In one aspect of the technology, one or more removable sheets of protective covering are applied over the adhesive coating, and the vinyl sheet 103 is rolled up or folded for storage prior to installation. The protective covering is preferably a thin sheet of stretchable and compressible polyethylene film about 2 mil. thick. In this aspect, the vinyl sheet 103 is installed by first unrolling and cutting a desired length from the roll, then removing the protective covering from the bottom surface of the vinyl sheeting 103 to expose the adhesive, then positioning the cut length over the modular floor tile 100, and then applying light pressure uniformly over the vinyl sheet 103 to adhere it to the modular flooring tile 100 (i.e., the base panel).

Referring more specifically to FIGS. 11-13, a synthetic modular tile 100 is shown, wherein the tile 100 has an upper portion which is formed by a plurality of intersecting cross members or ribs with openings disposed therebetween such that the cross members are arranged in a grid matrix. The upper portion has an upper surface 102 which can provide a primary support to foot, vehicle and other types of traffic. The upper portion of the tile 100 is supported above a base surface 105, such as concrete, by a plurality of support legs which extend downwardly from the upper portion. The support legs thus form a lower portion. Each of the support legs has a contact face at a bottom end thereof for resting on a base surface 105, such as concrete. The lower portion defines a generally open cavity within a perimeter of the floor tile 100 and between a lower surface of the grid matrix and a contacting surface of the base surface 105. In one aspect of the technology, the only portion of the tile 100 which extends through the open cavity is the support legs. In another aspect, however, compressible inserts made from rubber or another resilient material are inserted in the cavity below the tile 100 to provide additional flooring support.

Typical tile dimensions and composition will depend upon the specific application to the tile 100 will be applied. Sport uses, for example, generally require tiles 100 having a square configuration with a side dimension ranging from 9.0 inches to 12.0 inches in length. As with the base panel referenced above, those skilled in the art will appreciate other variations in size and composition that may be implemented within the parameters of the present technology.

Each of the sides of the tile 100 have side walls 15 with one or more coupling portions integrated therewith. In particular, two adjacent sides can include one or more male coupling portions 111 while the opposite two sides can include one or more female coupling portions. The male 111 and female coupling portions of one tile 100 can be configured to complimentarily mate with respective female and male 111 coupling portions of other adjacently positioned tiles 100. With this arrangement, the tiles 100 can be modularly interconnected, via the male 111 and female coupling portions, into columns and rows to form a tile array for positioning over a base surface 105. The tiles 100 may be coupled in pairs, two by two sections, four by four sections, one by two or one by four, or any number of arrangements as suits a particular purpose. While a specific coupling mechanism is referenced herein, it is understood that any number of temporary coupling mechanisms may be employed to join the tiles 100 together.

As noted above, vinyl sheeting 103 may be manufactured in large sheets that may be stored in a roll or other manner and then cut to a specific size or shape in order to suit a particular purpose. Molded modular tiles 100, on the other hand, while made of relatively inexpensive materials require the use of expensive molds. It is often times not viable to obtain molds of numerous shapes and sizes to accommodate different flooring needs. Even if an entity possesses the resources to acquire numerous molds, it is time consuming and cumbersome to change out molds in the manufacturing process.

In accordance with one aspect of the technology, a plurality of modular flooring tiles 100 are removably coupled together to form an upper surface 102. A vinyl sheet 103 (e.g., a vinyl composite structure) sized to approximate the upper surface 102 of a plurality of coupled tiles 100 is secured on the upper surface 102. In one non-limiting example, a plurality of four rectangular tiles 100, each having a side length of 12 inches, are coupled together to form a large rectangle having side lengths of 24 inches. A vinyl sheet 103 is cut to approximate the 24-inch by 24-inch section and is adhered or fastened to the upper surface 102 of the adjoined modular tiles 100 using any number of mechanical and/or chemical connections including, but without limitation, screws, bolts, pins, clips, urethane compositions, thermoset polymers and other adhesives. In the aspect where the vinyl sheet 103 is adhered to the upper surface 102 of a plurality of coupled modular tiles 100, an adhesive 104 is evenly distributed across the upper surface 102 of the coupled tiles 100. In this manner, the vinyl sheet 103 placed over the modular tiles 100 is utilized to create a singular modular flooring assembly 115 having the benefits of the molded modular tile 100 without the need to obtain new molds or change molds in existing manufacturing processes. Moreover, the upper contact surface 116 of the newly created composite flooring assembly 115 has no seams, minimizing the total amount of seams in flooring assembly. In other words, where a section of vinyl sheeting 103 is secured to a plurality of modular flooring tiles 100 creating a unitary composite flooring assembly 115 of the plurality of modular tiles 100 and the vinyl sheet 103, the unitary composite flooring assembly 115 has fewer seams than if the flooring assembly comprised only adjoining tiles 100. Reference is made herein to an adhesive 104 placed on top of the adjoining modular flooring tiles 100. However, the adhesive 104 may form part of the vinyl sheet 103 and pressed onto the top of the adjoined modular flooring tiles 100.

In one aspect of the technology, the vinyl sheet 103 is cut larger than the outer perimeter of the adjoined modular flooring tile assembly 115. That is, in an aspect where four 12-inch by 12-inch tiles 100 are coupled together to form a rectangular 24-inch by 24-inch section, the vinyl sheet 103 is cut to be slightly larger than 24-inches by 24-inches. The cut vinyl sheet 103 is then adhered to the top of the adjoined modular flooring tile assembly 115 and excess amounts of the vinyl sheet 103 are removed so that the edges of the vinyl sheet 103 are coplanar with sidewalls 110 of the outer perimeter of the adjoined modular flooring tile assembly 115. In one aspect of the technology, the locking mechanism 111 that is used to couple adjacent flooring tiles 100 together has a height that is less than the total height of the sidewalls 110 of the floor tiles 100 (i.e., base panels). In one non-limiting example, where the height of the floor tiles 100 is ½ inch, the height of the locking mechanism 111 is ¼ inch. In one aspect, once the vinyl sheet 103 is secured to an upper surface 102 of an adjoined modular flooring tiles 100, the adjoined modular flooring assembly 115 is placed upside down on a surface having a cutting device thereon. The height of the cutting device is set to be slightly larger than the thickness of the vinyl sheet 103. As the modular flooring assembly 115 is passed by the cutting device (e.g., a saw blade), the excess amount of vinyl sheeting 103 (e.g., the amount exceeding the 24-inch by 24-inch perimeter or that is hanging over the edge of the adjoined modular flooring tiles) is trimmed from the modular flooring assembly 115. The locking mechanisms 111 that are used to couple adjoining tiles 100 together have a height profile that begins at the base of the tile 100 and does not rise to the height of the sidewall 110. Thus, the height of the saw blade is set to remove the excess vinyl sheeting 103 without disturbing the locking mechanisms 111 on the underlying tile 100.

In one aspect, the adhesive 104 is not placed about the seams between adjoining modular tiles 100. By not placing an adhesive 104 about the seams of adjoining modular tiles 100, the coupled modular tiles 100 may flex at the seams during installation and use of the assembly 115. In another aspect of the technology, adhesive 104 is placed around the perimeter of the adjoined modular tiles 100 to minimize the likelihood that the edges of the vinyl sheet 103 peel off of the base panel or modular flooring tile 100. In another aspect of the technology, the upper surface 102 of the tiles 100 is scored or marred to improve the adhesion between the vinyl sheet 103 and the upper surface 102 of the tile 100.

In another aspect of the technology, a rubber underlayment 120 is disposed between the coupled modular tiles 100 and the base surface 105. While a rubber underlayment 120 is shown in the figures, it is understood that in certain applications, the rubber underlayment 120 is not used.

In one aspect of the technology, the upper surface 102 of the plurality of coupled tiles 100 comprises a plurality of apertures between a network of ribs. The vinyl sheet 103 may be fastened to the modular tiles 100 (rather than adhered) by using a plurality of mechanical fasteners. Alternatively, a combination of fasteners and adhesives may be used to optimize the manner in which the vinyl 103 is secured to the plurality of coupled modular tiles 100 depending on the configuration of the upper surface 102 of the modular tiles 100. Again, one advantage created is the ability to utilize existing modular flooring molds to create an improved modular flooring section having a different size and shape than the mold. While reference is made herein to a "continuous" vinyl sheet or synthetic overlay, it is understood that other sheets may be used herein with indentations or protrusions without departing from the scope or spirit of the technology. In one non-limiting example, the vinyl sheet or synthetic overlay comprises a plurality of ridges or indentations intended to increase the traction of the user.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A modular flooring panel, comprising:
   a plurality of at least two modular flooring tiles coupled together to form an upper surface defined by an outer perimeter;
   a plurality of side walls extending downward from the outer perimeter;
   a plurality of coupling members disposed about the side walls adapted to mate with coupling members of an adjacent flooring panel; and
   a compressible flexible continuous synthetic overlay disposed on top of and secured to the upper surface of the at least two modular flooring tiles, wherein the synthetic overlay comprises an outer perimeter substantially similar to the outer perimeter of the at least two modular flooring tiles, wherein the continuous synthetic overlay comprises a bottom layer comprising a polyurethane foam and a top layer comprising polyvinyl chloride.

2. The modular flooring panel of claim 1, wherein the continuous synthetic overlay is mechanically fastened to the upper surface of the at least two modular tiles.

3. The modular flooring panel of claim 2, wherein the continuous synthetic overlay ranges from 0.25 to 0.5 inches in thickness.

4. The modular flooring panel of claim 1, wherein the continuous synthetic overlay is adhered to the upper surface of the at least two modular tiles.

5. The modular flooring panel of claim 1, wherein the continuous synthetic overlay comprises a polyurethane foam.

6. The modular flooring panel of claim 1, wherein the continuous synthetic overlay comprises a point elastic flooring surface.

7. A modular flooring panel, comprising:
   a plurality of at least two modular flooring tiles coupled together to form an upper surface defined by an outer perimeter;
   a plurality of side walls extending downward from the outer perimeter;
   a plurality of coupling members disposed about the side walls adapted to mate with coupling members of an adjacent flooring panel; and
   a flexible continuous synthetic overlay disposed on and secured to the upper surface of the at least two modular flooring tiles, wherein the synthetic overlay comprises an outer perimeter substantially similar to the outer perimeter of the at least two modular flooring tiles, wherein the continuous synthetic overlay comprises a bottom layer comprising a polyurethane foam and a top layer comprising polyvinyl chloride.

8. The modular flooring panel of claim 7, wherein the synthetic overlay is planar.

9. The modular flooring panel of claim 7, wherein the synthetic overlay is compressible.

10. The modular flooring panel of claim 7, comprising a plurality of at least four modular flooring tiles coupled together to form an upper surface covered by the flexible continuous synthetic overlay having an outer perimeter substantially similar to the outer perimeter of the plurality of at least four modular flooring tiles.

* * * * *